United States Patent [19]

Merl

[11] Patent Number: 5,014,954
[45] Date of Patent: May 14, 1991

[54] ADJUSTABLE DISPLAY ARM ASSEMBLY

[75] Inventor: Milton Merl, New York, N.Y.

[73] Assignee: Marlboro Marketing, Inc., New York, N.Y.

[21] Appl. No.: 477,064

[22] Filed: Feb. 7, 1990

[51] Int. Cl.⁵ .................................................. E04G 3/00
[52] U.S. Cl. ................................. 248/285; 211/105.3
[58] Field of Search ............... 248/285, 287, 298, 279, 248/282, 286, 289.1, 122; 211/105.3, 59.1, 105.1; 403/92

[56] References Cited

U.S. PATENT DOCUMENTS

| 481,293 | 8/1892 | Bailey | 248/287 X |
| 1,493,609 | 5/1924 | Dailey | 248/289.1 X |
| 1,755,093 | 4/1930 | Appel | 248/287 X |
| 1,912,287 | 5/1933 | Lundell | 248/285 |
| 3,032,273 | 5/1962 | Spielman | 211/105.3 X |
| 4,658,967 | 4/1987 | Wang | 211/182 X |
| 4,679,756 | 7/1987 | Wood | 403/92 X |
| 4,856,741 | 8/1989 | Schaefer | 248/122 X |
| 4,882,868 | 11/1989 | Fast | 211/59.1 X |

Primary Examiner—J. Franklin Foss
Attorney, Agent, or Firm—Darby & Darby

[57] ABSTRACT

A display for supporting merchandise includes a horizontal arm assembly comprising a pair of elongated nesting segments that can be selectively and reversibly locked at a number of longitudinally positions relative to each other. One end of the arm assembly is free. The other end connects to an indexing pin assembly that in turn connects to a support structure. A support bracket directly connects to the support structure, for example, a wall, and the arm assembly mounts to the support bracket by a vertical indexing pin that is rotatably supported in support bracket openings and keyed to the support arm. A key on the indexing pin engages any one of a plurality of slots on the support bracket to selectively set the angular position of the arm assembly relative to the support structure. Arm length is adjustable without using tools.

11 Claims, 4 Drawing Sheets

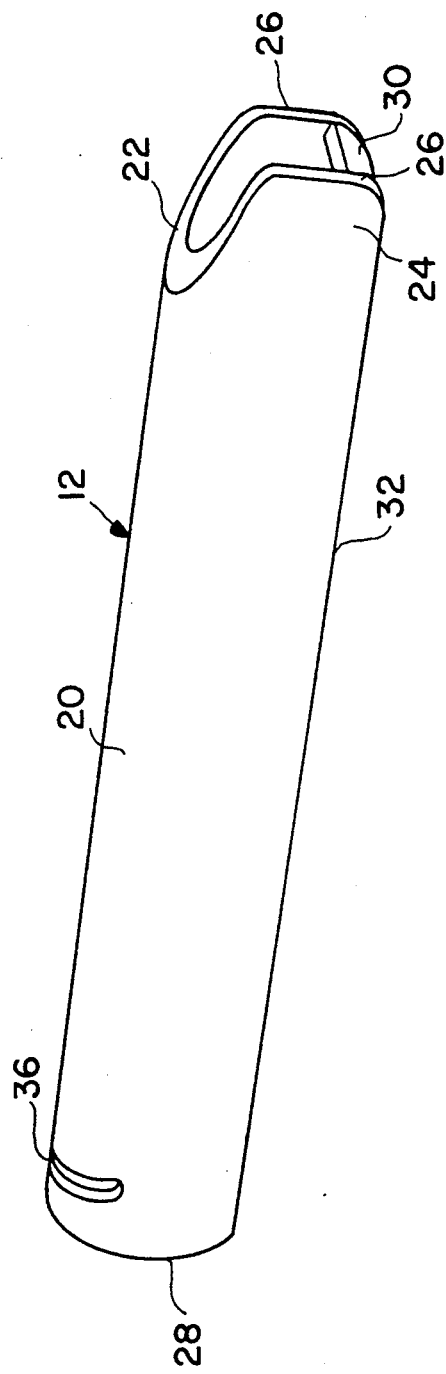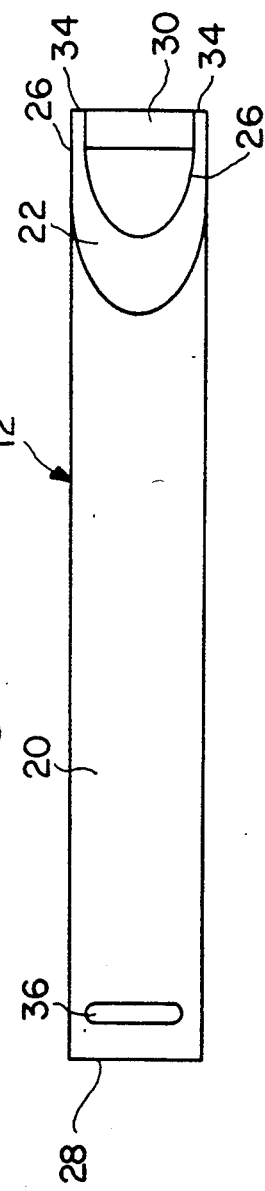
FIG. 2
FIG. 3

ADJUSTABLE DISPLAY ARM ASSEMBLY

BACKGROUND OF THE INVENTION

This invention relates generally to a merchandise display device for supporting merchandise thereon, and more particularly concerns a cantilevered rod or arm display whereon merchandise is hung, for example, clothing from a hanger. Many items of merchandise, especially light-weight items, are intended for display by hanging from specially designed display arms of extended length that have a free end and an end fixedly attached to a support surface, for example, a wall. The arm for hanging merchandise thereon generally extends horizontally at a right angle with the supporting wall. However, because of constraints in setting up display devices on a selling floor, display arms of fixed construction are frequently too short or too long for the intended space or perhaps the arm extends at an angle from the support structure which takes poor advantage of the available space. Therefore, many different arm assemblies may be required to satisfy ongoing needs. Selection and interchanging of display arms are time consuming and inconvenient.

What is needed is a display arm that can be easily adjusted for varying lengths and orientation angles relative to a support structure without need for removal of the arm or interchanging of parts.

SUMMARY OF THE INVENTION

Accordingly, it is an object of this invention to provide an improved display arm that is readily adjustable in arm length and orientation with respect to a support structure.

A further object of this invention is to provide an improved display arm that has few parts and is easy to assemble at the display location.

Yet another object of the invention is to provide an improved display arm that is easily detached from the support structure.

Another object of this invention is to provide an improved display arm that is attractive in appearance and has few components.

Generally speaking, the display arm assembly in accordance with the invention for supporting merchandise includes a horizontal arm assembly comprising a pair of elongated nesting segments that can be selectably and reversibly locked at any number of longitudinal positions relative to each other. One end of the arm assembly is free whereas the other end connects to an indexing pin assembly that in turn connects to a support structure. A support bracket is directly connected to the support structure, for example, a wall, and the arm assembly mounts to the support bracket by a vertical indexing pin that is rotatably supported in openings in the support bracket and is keyed to the support arm. A key on the indexing pin engages any one of a plurality of slots on the support bracket to selectively set the angular position of the arm relative to the support structure.

Other objects, features and advantages of the invention will be apparent from the specification. This invention accordingly comprises the features of construction, combination of elements and arrangement of parts that will be exemplified in the constructions hereinafter set forth, and the scope of the invention will be indicated in the appended claims.

BRIEF DESCRIPTION OF THE DRAWINGS

For a fuller understanding of the invention, reference is made to the following description taken in connection with the accompanying drawings, in which:

FIG. 2 is a top perspective view of the outer arm;

FIG. 3 is a top view of the outer arm;

FIG. 8 is a partial exploded view in perspective of an end of the arm assembly; and FIG. 9a–c are alternative arm assembly cross sections in accordance with the invention.

DESCRIPTION OF THE PREFERRED EMBODIMENTS

Figure 1:
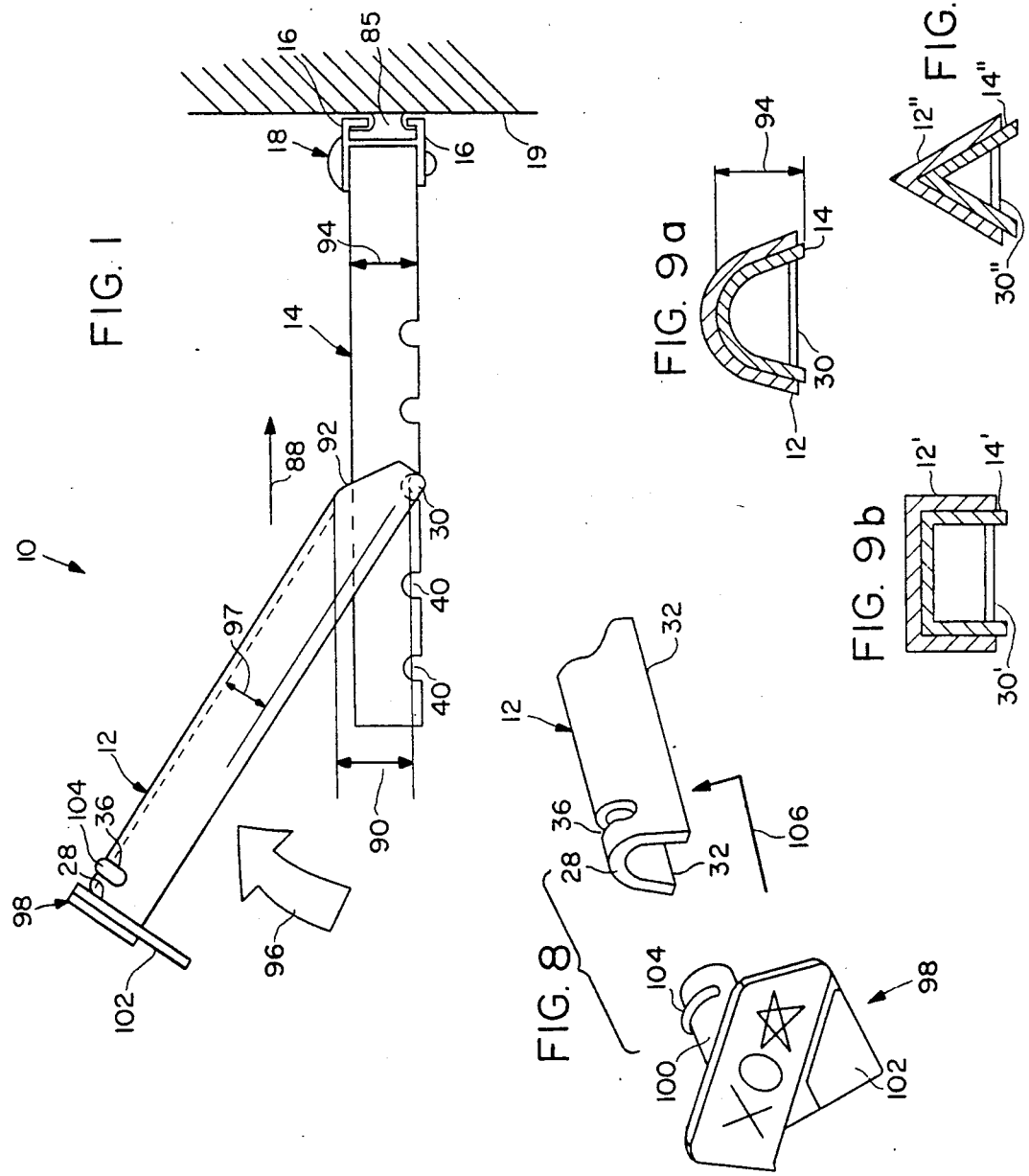
FIG. 1 is a side elevational view of the adjustable display arm assembly in accordance with the invention, with the outer arm in a pivoted position.
Figure 4:
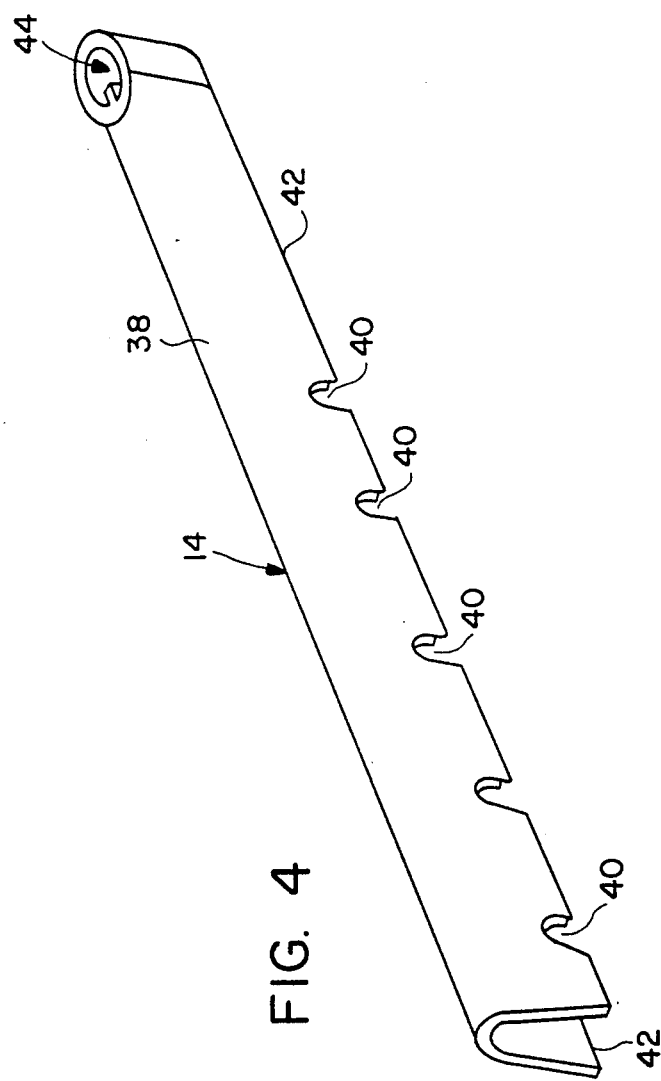
FIG. 4 is a top perspective view of the inner arm.

The adjustable display arm assembly 10 in accordance with the invention includes an outer movable arm 12, an inner arm 14, a support bracket 16 and an indexing pin assembly 18.

The outer arm 12 is a U-shaped channel 20 of extended length that has an inclined surface 22 at one end 24. The surface 22 meets with the end edges of the branches 26 of the U-shape and extends toward the opposite end 28 of the U-shaped channel 20. A cylindrical pin 30 extends transversely between the branches 26 of the U-shape, the pin 30 being positioned adjacent to the lower edges 32 and rear edges 34 of the channel 20. A slot 36, which is transverse to the length of the channel 20 is formed through the curved crest of the U-shaped channel 20.

The inner arm 14 is also a U-shaped channel 38 of extended length and dimensioned such that the channel 38 can be nested within the channel 20 of the outer arm 12. A plurality of substantially semicircular notches 40 are formed in the lower edges 42, the notches 40 being at regularly spaced longitudinal intervals along the inner arm 14. The notches 40 are dimensioned to receive therein the pin 30 of the outer arm 12.

Figure 5:
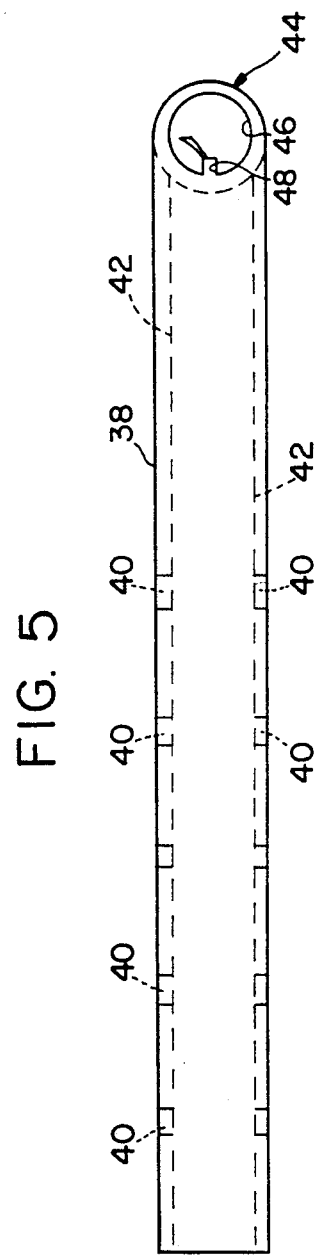
FIG. 5 is a top view of the inner arm.
Figure 7:
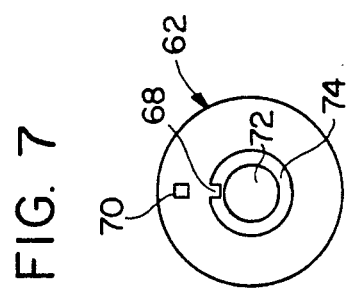
FIG. 7 is a bottom view of the indexing pin of FIG. 6.

At one end of the inner arm 14 is a vertically oriented socket or bearing 44 that includes a substantially circular bore 46 having a rectangular key 48 extending from the bore surface into the cylindrical opening as best illustrated in FIG. 5.

The socket or bearing 44 at the end of the inner arm 14 connects to the support bracket 16, which includes an upper flange 50 and a lower flange 52 connected together by a cross bar 54. The spacing between the upper flange 50 and lower flange 52 allows for the socket or bearing 44 to be received therebetween with a sliding fit. Holes 56, 58 in the upper flange 50 and lower flange 52, respectively, align with the bore 46 of the inner arm 14 when the inner arm is slipped between the flanges 50, 52.

A plurality of rectangular slots 60, formed concentrically around the hole 56 in the upper flange 50 of the support bracket 16, are used in angular alignment of the inner arm 14 relative to a support structure 19 when the complete assembly 10 is mounted to the support structure 19.

A locking or indexing pin 62 comprises a circular head 64 connected to a cylindrical body 66 that includes a rectilinear keyway 68 running the length of the body 66. The keyway 68 is dimensioned to receive therein the key 48 of the inner arm 14.

A key 70 extends from the bottom surface of the pin head 64 and is dimensioned to be received in the slots 60 on the upper flange 50 of the support bracket 16 when the body 66 of the pin 62 passes through the holes 56, 58 of the support bracket 16. The body 66 of the pin 64 is hollow, at least for a portion of its length, having a circular opening 72 in the bottom surface 74 wherein a closure pin 76 is received. The pin 76 includes a head 78 and body 80.

Upper and lower rear wings 82, 84 join to the crossbar 54 of the support bracket 16 and provide a C-shaped attachment member for connecting to the support structure 19 by any suitable means. With such a mounting arrangement, as illustrated (54, 82, 84), the support bracket 16 can be connected to a correspondingly-shaped T element 85 fixedly attached to the support structure 19. Any suitable means of attachment between the support bracket 16 and the support structure 19 may be used, including, for example, adhesives, screws, clamps, etc.

The adjustable display arm assembly 10 in accordance with the invention is assembled as follow. The support bracket 16 is rigidly connected to the desired support structure 19 in any suitable manner. Then, the socket or bearing 44 on the inner arm 14 is slipped between the upper and lower flanges 50, 52 of the support bracket 16. The pin 62 is then inserted through the flange opening 56, through the aligned circular bore 46 of the inner arm 14, so that the key 48 is received in the keyway 68 of the locking pin 62. This engagement of the key 48 in the keyway 68 fixes the angular position of the inner arm 14 relative to the longitudinal axis of the locking pin 62.

Figure 6:
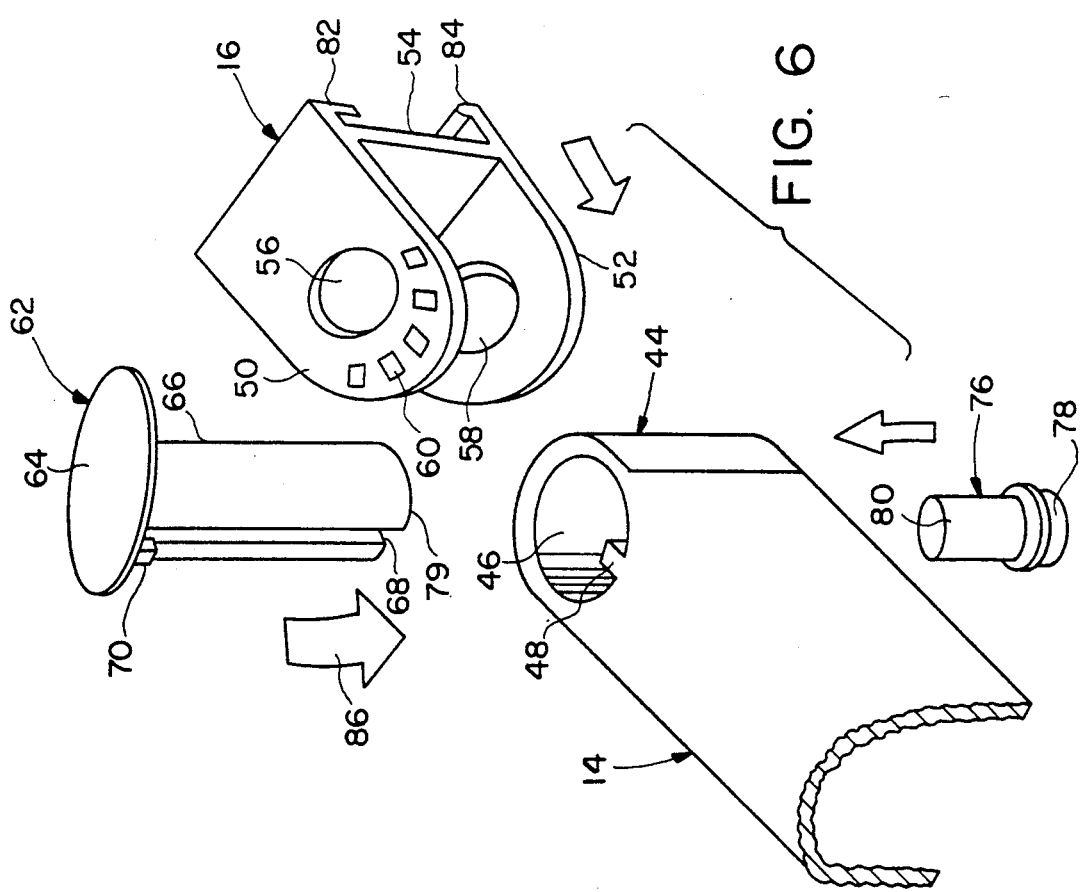
FIG. 6 is a partial exploded view in perspective of the attachment of the inner arm to a support bracket.

Before the locking pin 62 is fully seated in the downward direction, indicated by the arrow 86 (FIG. 6) the key 70 on the under side of the pin head 64 is aligned with any desired one of the slots 60 on the upper flange 50 of the support bracket 16. After this desired alignment is achieved, the locking pin 62 is pressed further downward in the direction of the arrow 86 such that the key 70 seats in the aligned slot 60. Thus, the angular position of the arm 14 relative to the bracket 16 and structure 19 is fixed. Attachment of the inner arm 14 to the support bracket 16 is completed by insertion of the closure pin 76 into the cylindrical opening 72 in the bottom surface 74 of the locking pin 62. The closure pin 76 can be permanently fastened in place, for example, by means of an adhesive, or there may be a reversible press or snap fit. Once the closure pin 76 is engaged with the locking pin 62, the inner arm 14 is fixed in position relative to the support structure 19.

Then, the outer arm 12 is slipped onto the inner arm 14. This can only be accomplished when the free end 28 of the outer arm 12 is pivoted in the direction of the arrow 96 and elevated above the inner arm 14 (FIG. 1). Then, the outer arm 12 is translated in the direction indicated by the arrow 88. In this pivoted and elevated position, the spacing 90 between the pin 30 and the internal crest 92 of the U-shape of the outer arm 12, is greater than the height 94 of the inner arm 14. Thus, the outer arm 12 can be translated to any position along the length of the inner arm 14 before the outer arm is pivoted downwardly, in the direction opposite to the arrow 96, until the arms 12, 14 are nesting, in parallel (not shown) with the pin 30 seated in the selected opposed pair of semi-circular notches 40. No tools are required to adjust the length of the display arm.

In this parallel nested position, longitudinal translation of the arms 12, 14, relative to each other is not possible, except by again pivoting the arm 12 relative to the arm 14 in the direction 96 as shown in FIG. 1. The internal height 97 of the outer arm 12 between the pin 30 and the internal crest 92 being less than the height 94 of the inner arm 14 prevents disengagement of the pin 30 from the slots 40 when the arms 12, 14 are parallel.

For the sake of interesting, attractive and variable appearance and to remove a possible hazard, the open end 28 of the outer arm 12 is closed off with a closure plate 98 having a cylindrical body 100 connected at right angles to a nameplate 102. An arcuate boss partially encircles the body 104 and is positioned along the length of the body 100 such that when the body 100 is pressed in the direction of the arrow 106 into the U-shaped opening of the outer arm 12, the arcuate boss 104 engages in the slot 36 of the upper arm 12. The closure plate 98 is held in position on the outer arm 12 by a press fit and is readily interchangeable. The nameplate 102 may include a trademark, letters or design as indicated in FIG. 8, and is easily customized to suit a particular manufacturer or merchandiser.

In alternative embodiments of an adjustable display arm assembly in accordance with the invention, more than one key 70 may be provided on the underside of the head 64 of the locking pin 62, and additional slots 60 may be provided in the upper flange 50 to accommodate such additional keys. Also, it should be understood, that there may be protrusions corresponding to the key 70 extending upward from the upper surface of the upper flange 50 on the support bracket 16 that engage in recesses in the underside of the head 64 of the locking pin 62. Further, there may be more than one key 48 protruding from the surface of the bore 46 and a corresponding number of keyways 68 would be provided in the body 66 of the locking pin 62. Also, the position of the key 48 and keyway 68 could be reversed with a key protruding from the body 66 of the pin 62 to be received in a keyway located as a recess in the bore 46. In another alternative embodiment in accordance with the invention, the closure pin 76 may be screwed into the cylindrical opening 72 of the pin 62 in a self-tapping fashion, or the inner surface of the cylindrical opening 72 can be threaded to receive a threaded pin 76. The sloping surface 22 may be replaced with, for example, a right angled notch.

Also, the U-shape can be achieved with right-angled channels 12',14' (FIG. 9b), and, in the sense of this invention, the intersecting branches 13", 14" (inverted V) of FIG. 9c are considered as U-shaped. Basically, any nesting cross sectional shapes can be adapted, using a pin 30, 30', 30" etc., to provide longitudinal relative translation between the inner and outer arms only when the outer arm is upwardly pivoted as in FIG. 1.

The adjustable display arm assembly 10 may be fabricated of any suitable rigid materials depending upon the load that is to be carried on the cantilevered arms. Thus, the entire assembly may be of wood, metal or rigid plastic, or combinations thereof.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense. It is also to be understood that the following claims are intended to cover all of the generic and specific features of the invention hereindescribed and all statements of the scope of the invention that might be said to fall therebetween.

What is claimed:

1. An adjustable arm assembly comprising:
    an elongated outer arm having a substantially U-shaped cross section as viewed transversely to the length dimension of said arm, said U-shape including a pair of separated legs joined together by a connecting segment, said legs extending longitudinally beyond a rear edge of said connecting segment at one end of said elongated outer arm, pin means at said portion of said one end of said outer arm rearwardly of said rear edge of said connecting segment, said pin means extending into the gap between the separated legs of said U-shaped cross section;
    an elongated inner arm having a substantially U-shaped cross section as viewed transversely to the length dimension of said inner arm, said U-shape including a pair of separated legs joined together by a connecting segment, said inner arm removeably nesting within the U-shape of said outer arm, a plurality of notches formed in the edges of said separated legs of said inner arm and spaced apart in the length direction of said inner arm, said notches being dimensioned for removeably receiving said pin means therein, the distance between said pin means and said rear edge of said connecting segment of said outer arm exceeding the height of said inner arm, said height being measured perpendicularly to the length dimension of said inner arm from said lower edge to the top surface thereof, said inner and outer arms being translatable relative to each other in the length direction when said outer arm is pivoted away from said inner arm, said pivoting being about said pin means, the vertical distance between said pin means and an imaginary extension of said connecting segment of said outer arm being less than the vertical height of the inner arm so that when nested translation movement can occur only in response to pivoting said outer arm, allowing said pin means to exit the notch; and
    support means for connecting said inner arm at one end to a support structure of a plurality of rotated positions.

2. An adjustable display arm assembly as in claim 1, wherein said U-shaped cross section is one of U-shaped, ⊔-shaped and V-shaped.

3. An adjustable display arm assembly as in claim 1, wherein said rotatable support means of said inner arm includes a bore through said inner arm at said one end thereof, said bore being vertical when said display arm assembly is mounted, in use, to said support structure, said means for connecting including a bracket fastenable to said support structure, said bracket having a pair of spaced flanges with an aligned clearance hole in each said flange, said one end of said inner arm being received between said flanges with said arm bore aligned with said clearance holes,
    a pin passing through said bracket clearance holes with a rotative fit and through said arm bore, and holding means for fixed engagement of said inner arm with said pin.

4. An adjustable display arm assembly comprising:
    an arm of extended length;
    horizontally rotatable support means for connecting said arm at one end to a support structure in any one of a plurality of rotated positions,
    said rotatable support means of said arm includes a bore through said arm at said one end thereof, said bore being vertical when said display arm assembly is mounted, in use, to said support structure,
    said means for connecting including a bracket fastenable to said support structure, said bracket having a pair of spaced flanges with an aligned clearance hole in each said flange, said one end of said arm being received between said flanges with said arm bore aligned with said clearance holes,
    a pin passing through said bracket clearance holes with a rotative fit and through said arm bore, and holding means for fixed engagement of said arm with said pin,
    wherein said means for fixed engagement includes a first key on one of said pin and said arm within said bore, and a keyway on the other one of said pin and said arm within said bore, said first key and keyway being engaged when said pin enters said bore.

5. An adjustable display arm assembly as in claim 3, and further comprising indexing means for selectively setting the rotative position of said pin relative to said bracket.

6. An adjustable display arm assembly as in claim 4, and further comprising indexing means for selectively setting the rotative position of said pin relative to said bracket.

7. An adjustable display arm assembly comprising:
    an arm of extended length;
    horizontally rotatable support means for connecting said arm at one end to a support structure in any one of a plurality of rotated positions,
    said rotatable support means of said arm includes a bore through said arm at said one end thereof, said bore being vertical when said display arm assembly is mounted, in use, to said support structure,
    said means for connecting including a bracket fastenable to said support structure, said bracket having a pair of spaced flanges with an aligned clearance hole in each said flange, said one end of said arm being received between said flanges with said arm bore aligned with said clearance holes,
    a pin passing through said bracket clearance holes with a rotative fit and through said arm bore, and holding means for fixed engagement of said arm with said pin;
    indexing means for selectively setting the rotative position of said pin relative to said bracket;
    wherein said indexing means includes a key on a surface on one of said pin and a flange of said bracket, and a plurality of slots sized to receive said key on an opposed surface of the other one of said pin and flange, said key and one said slot being engaged when said pin is fully seated in said bore.

8. An adjustable arm assembly as in claim 1, and further comprising:
    a closure plate having means for connecting to said outer arm at the other end of said outer arm, said closure plate covering the U-shaped cross section of said outer arm at said other end.

9. An adjustable arm assembly as in claim 8, wherein said means for connecting includes a body dimensioned for a press fit within the U-shape of said outer arm.

10. An adjustable arm assembly as in claim 9, wherein said body has a protrusion from a surface thereof, and said outer arm includes a recess, said protrusion seating in said recess when said body is press-fitted to said outer arm.

11. An adjustable arm assembly as in claim 9, wherein said closure plate includes a nameplate connected to said body, said nameplate being suited to display a design or identification information.

* * * * *